United States Patent [19]

Schwab

[11] 4,076,288
[45] Feb. 28, 1978

[54] ZERO SPEED SENSING SAFETY LATCH APPARATUS

[75] Inventor: Christopher Morrison Schwab, Cupertino, Calif.

[73] Assignee: Beckman Instruments, Inc., Fullerton, Calif.

[21] Appl. No.: 678,019

[22] Filed: Apr. 19, 1976

[51] Int. Cl.$^2$ .............................................. E05C 3/14
[52] U.S. Cl. ................................... 292/113; 292/201
[58] Field of Search ..................... 292/210, 336.3, 144, 292/201–207, 106, 113

[56] References Cited

U.S. PATENT DOCUMENTS

| | | | |
|---|---|---|---|
| 1,582,791 | 4/1926 | Bodenschaty | 210/146 |
| 1,797,602 | 3/1931 | Bryson | 142/136 |
| 1,989,213 | 1/1935 | Schenck | 192/136 |
| 2,591,317 | 4/1952 | Tholl | 233/1 |
| 2,955,693 | 10/1960 | Renault et al. | 192/136 |
| 3,325,200 | 6/1967 | Fowler | 292/113 |
| 3,734,290 | 5/1973 | Nelson | 210/146 |
| 3,762,552 | 10/1973 | Landwier | 210/146 |
| 3,763,670 | 10/1973 | Harrold | 68/12 R |
| 3,866,825 | 2/1975 | Baloyer | 233/1 B |
| 3,873,020 | 3/1975 | Icking et al. | 233/1 B |

Primary Examiner—Richard E. Moore
Attorney, Agent, or Firm—Robert J. Steinmeyer; Ferd L. Mehlhoff; William H. May

[57] ABSTRACT

A control element for sensing the motion of a movable member within a machine to automatically prevent opening of a cover or guard on the machine when the member is moving. The control element has one of its ends brought into contact with a portion of the movable member and its other end connected to a latching mechanism located adjacent the machine cover. Being an elongated flexible member, the control element moves in response to the movement of the movable member. When the member is stationary, the end of the control element in contact with the movable member causes the control element to become an elongated rigid member to permit the latching mechanism to turn and allow the opening of the cover over the movable member. When the member is moving, the contact end of the control element adjacent the member is deflected, causing the other end of the control element connected to the latching mechanism to recede from its rigid position and preventing the movement of the latching mechanism to retain the cover in a locked position over the moving member.

9 Claims, 6 Drawing Figures

ZERO SPEED SENSING SAFETY LATCH APPARATUS

BACKGROUND OF THE INVENTION

This invention is related to the field of latching mechanisms and, more particularly, is related to the field of latching mechanisms which prevent the opening of a cover or guard over a movable or rotatable member, such as a centrifuge rotor, when it is moving.

An extremely important safety consideration with respect to the operation of a centrifuge or any other high speed moving member is to prevent the opening of the cover while the device is still moving. Because items such as rotors are moving at extremely high speeds, an inadvertent contact with the rotor during its operation could result in serious harm. Although it would be an extremely remote possibility, the opening of the centrifuge cover while the rotor is spinning might expose the operator to an extreme safety hazard if, while the cover is open, sample holding test tubes sitting within the rotor should break, sending fragmented pieces out of the centrifuge at high speed.

Several prior art devices have addressed the problem of establishing a motion sensing safety lock to secure a cover over a rotatable member. However, such prior art arrangements typically incorporate a very complex and undesirable multitude of parts to achieve a satisfactory, but expensive safety lock. Incorporated within several of these prior art arrangements is some type of contact member which is designed to engage the rotatable member in order to sense its mode of operation. However, these contact members utilize a complicated design of a plunger element which is spring biased within a movable cylinder, so that contact with the rotatable member, when it is rotating, will cause the contact member to tilt or move in a certain direction to prevent a latching device from allowing the opening of the cover.

Some of the prior art approaches utilize a more expensive and complex electrical circuitry arrangement to insure that the rotatable member is completely stopped before the cover can be opened. Other prior art devices incorporate a simple power disengaging switch for cutting off the power when the cover is opened. However, this does not completely solve the problem, since the rotatable member may still be rotating or coasting at high speed when the cover is opened. Substantially all of the prior art sensing arrangements utilize an unnecessarily complicated mechanism adjacent the rotating member that must be interconnected through some type of connecting means to the latching device that controls the opening of the cover or guard. These complicated structures require a significant amount of space within the overall machine and unnecessarily contribute to a larger machine.

In some instances the machine may be rather small for table top use, requiring a small uncomplicated, but dependable sensing device to be connected to the latching mechanism for preventing the opening of the cover or guard during the rotating movement of the rotatable member.

SUMMARY OF THE INVENTION

The present invention utilizes an elongated flexible control element extending between a rotatable member and a latching mechanism for a cover or guard over a moving device. The control element is movable between a first and a second engaging position with the rotatable member where in its first engaging position a contact end of the control element abuts the rotatable member when it is stationary and the other end of the control element rigidly interacts with the latching mechanism to allow the unlocking of the cover. On the other hand, in its second engaging position the contact end of the control element adjacent the rotatable member is deflected by the rotation of the rotatable member, causing the other end of the control element to recede from its previous rigid orientation and block movement of the latching mechanism to prevent an opening of the cover.

The control element has a single generally uniform elongated configuration from the end which contacts the rotatable member to the end which contacts the latching mechanism. The control element can be of any length desired in order to provide a sensing contact between the latching mechanism and the movement of the rotatable member. Consequently, it is possible to position the latching mechanism at any convenient location within the machine, since the control element can be extended to reach the rotatable member from any position.

Because the control element is flexible, the movement of the rotatable member causes the contact end of the control element to deflect as it is brought in contact with the rotatable member and causes the control element to move within its containment sheath to expose a stop bar adjacent the latching mechanism to prevent movement of the latching mechanism to an unlocked position. The control element is comprised of a generally uniform sized element throughout its longitudinal length, presenting a very simple and uncomplicated arrangement for sensing the movement of the rotatable member and allowing for its use in a relatively small space which is conducive to small machines where space is critical.

Consequently, the present invention provides a sensing device to cooperatively function with the latching mechanism of a cover or guard to automatically prevent the opening of a cover during the movement of a rotatable member. The control element is inexpensive to construct and, being relatively uncomplicated, presents a highly dependable arrangement.

DETAILED DESCRIPTION OF THE INVENTION

Figure 1:
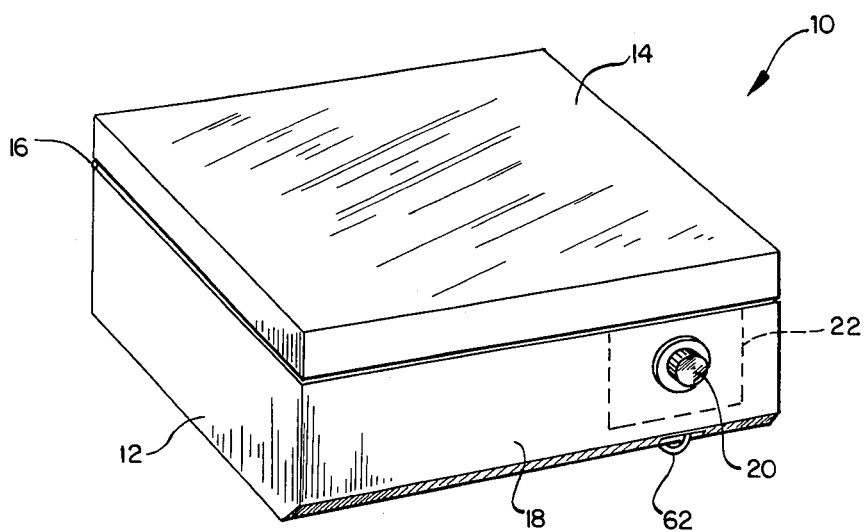
FIG. 1 is a schematic perspective view of a table top centrifuge.

FIG. 1 shows a table top centrifuge 10 having a base portion 12 which contains the high speed rotor (not shown). A cover 14 is pivotally mounted by a hinge arrangement 16 on the base 12 to allow access to the rotor for placement and removal of test samples which are to be subjected to the centrifugation operation. Mounted on one face 18 of the base portion 12 is an unlocking knob 20 designed to release the cover 14 and allow its pivotal movement about the hinge arrangement 16 for access to the rotor. Mounted within the face 18 of the centrifuge base portion 12 is a latching mechanism 22 connected to the knob 20 and shown in FIGS. 2 and 3. The general location of the latching mechanism 22 within the base portion is schematically depicted in phantom in FIG. 1.

Figure 2:
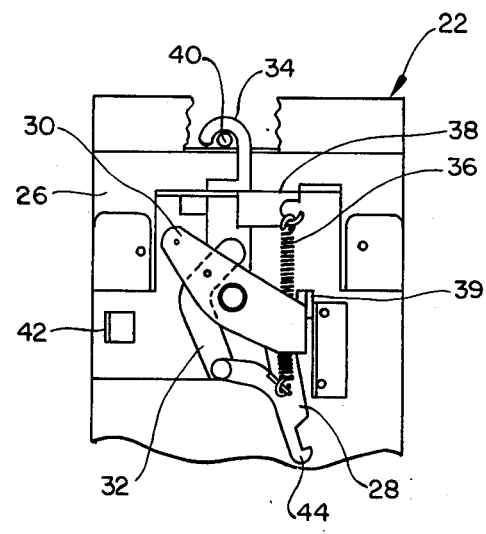
FIG. 2 is a schematic view of the latching mechanism in its locked position.

The latching mechanism 22 in FIG. 2 has a base plate 26 on which is mounted a turning arm 28 that is connected to the knob connecting plate 30. Further, the turning arm 28 has an extended arcuate portion 32 which connects with the latching hook 34. A coil spring 36 is connected between the turning arm 28 and a fixed flange 38 mounted on the base plate 26. The spring 36 in its orientation of FIG. 2 will tend to cause the arm 28 to move in a counterclockwise direction with respect to FIG. 2, but the limit flange 39 will prevent any movement of the turning arm 28 in a counterclockwise direction beyond a certain position. The locking mechanism 22 in FIG. 2 is shown in the locked orientation with the locking hook 34 engaged with a latch bar 40 that is located on the cover 14 in FIG. 1. Therefore, in the orientation as shown in FIG. 2 the latching mechanism 22 prevents the pivoting of the cover 14 in FIG. 1 to an open position away from the centrifuge base portion 12.

Figure 3:
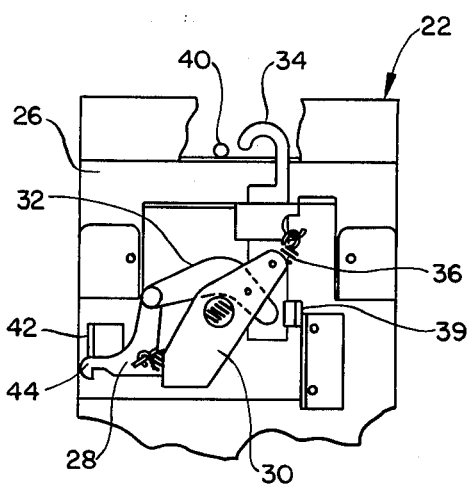
FIG. 3 is a schematic view of the latching mechanism in its unlocked position.

As shown in FIG. 3 the turning arm 28 is designed to be turned in a clockwise direction with respect to FIG. 3 by a clockwise turning of the knob 20 in FIG. 1 which is mounted on the connecting plate 30 in FIG. 3. At some position during the movement of the turning arm 28 from its position in FIG. 2 to its position in FIG. 3 the coil spring 36 will exert a clockwise pulling force on the turning arm 28 for continued clockwise movement on the base plate 26. However, a stop flange 42 is located on the base plate 26 to prevent movement of the turning arm 28 beyond a certain position. The movement of the turning arm 28 to its orientation shown in FIG. 3 results in an upward and lateral movement to the right with respect to FIG. 3 of the hook member 34 away from the lock bar 40, unlocking the cover 14 to allow the pivoting of the cover 14 to an open position.

Therefore, the operation of the knob 20 in FIG. 1 controls the movement of the latching mechanism 22 of FIGS. 2 and 3 between a locked and an unlocked orientation. However, as shown in FIGS. 4 through 6, the present invention incorporates a sensing arrangement 46 which is designed to sense whether or not the rotor is moving within the centrifuge and prevent the unlocking of the latching mechanism 22 when there is movement of the rotor.

Figure 6:
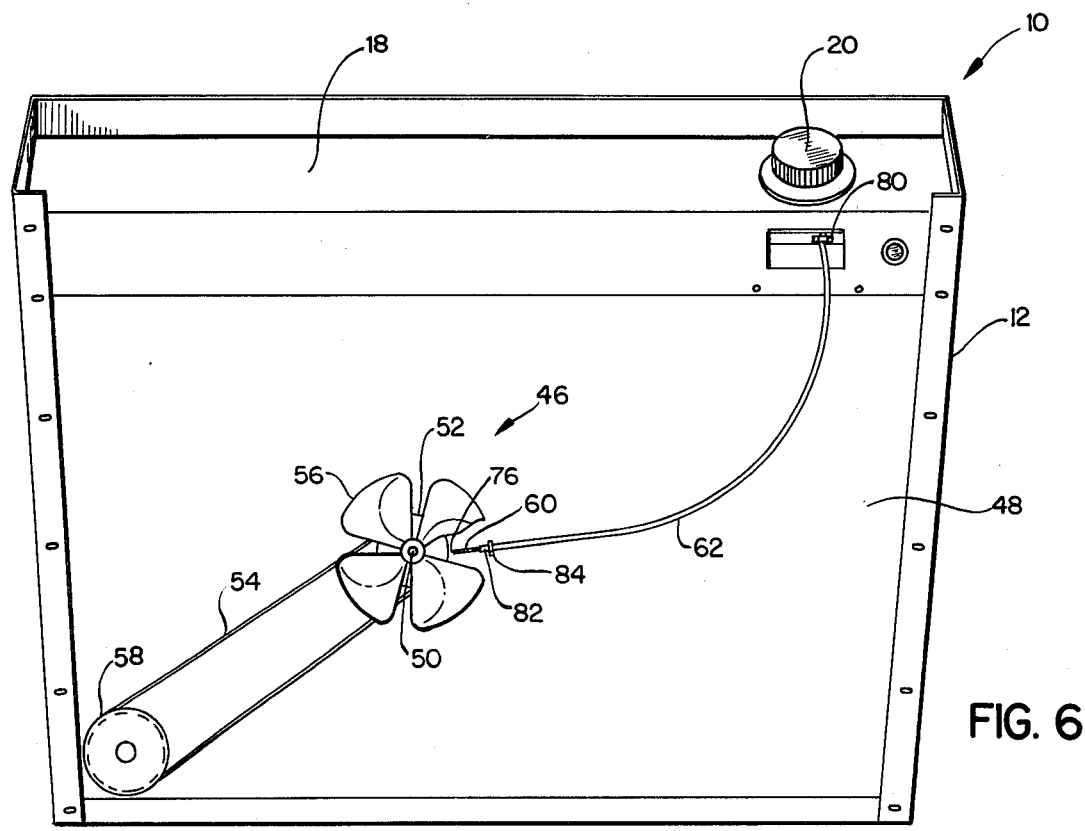
FIG. 6 is a perspective view of the bottom of the table top centrifuge showing the location of the control element.

In FIG. 6 the bottom 48 of the table top centrifuge 10 is shown with a central rotor shaft 50 having a pulley 52 for receipt of a drive belt 54 to drive both the rotor (not shown) and a circulation fan 56. A motor drive pulley 58 is in driving engagement with the drive belt 54. A control element 60 is slidably mounted within a sheath 62, extending between a position adjacent the pulley 52 and a position adjacent the latching mechanism (not shown) connected to the unlocking knob 20. Consequently, whenever the rotor is rotating, the pulley 52 will also be rotating, since they operate off the common shaft 50. The control element 60 is in close tolerance with the inner surface of the sheath 62 to prevent any relative buckling or bending by the control element 60 during its sliding movement within the sheath 62.

Figure 4:
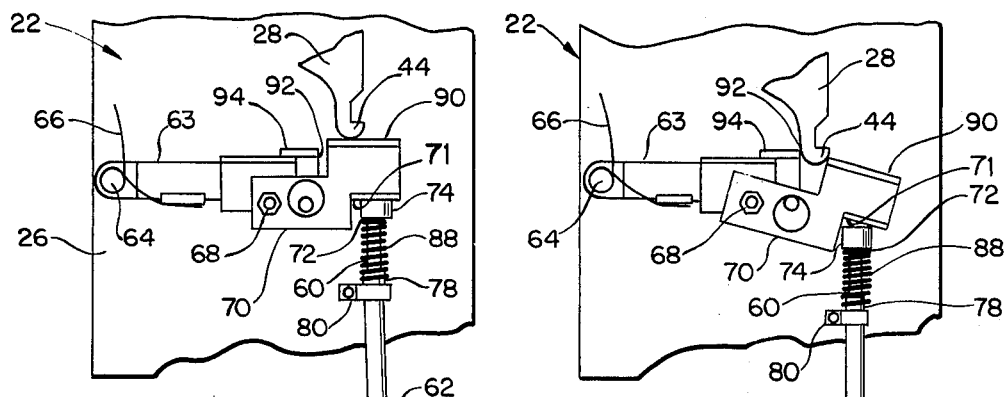
FIG. 4 is a schematic view of the control element mounted between the latching mechanism and the rotatable shaft and showing the position of the control element when the rotatable member is stationary.
Figure 5:
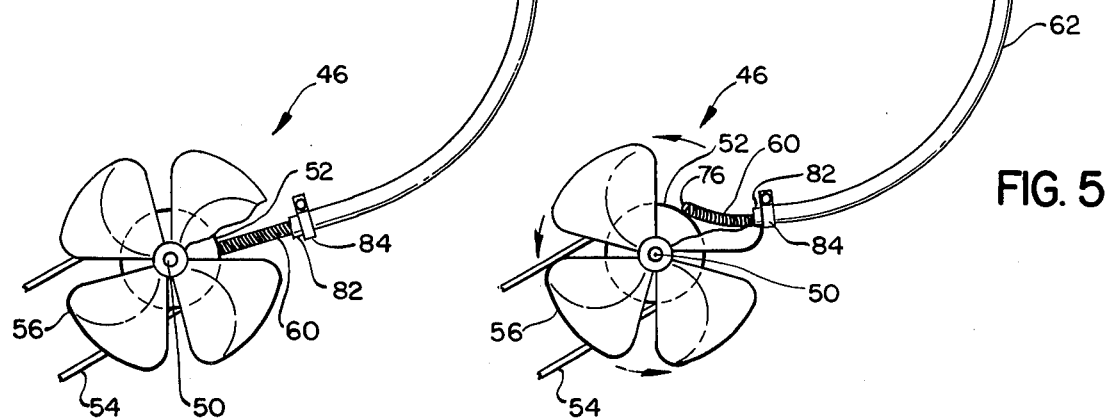
FIG. 5 is similar to FIG. 4 and shows the position of the control element when the rotatable member is moving.

With respect to FIG. 4, pivotally mounted on the base plate 26 adjacent the turning arm 28 is a stop or limit lever 63 which is slightly biased in a counterclockwise direction about the pivot pin 64 by the spring 66. Pivotally mounted at a pivot junction 68 on the stop lever 63 is a reaction lever 70 which has a flanged surface 71 in contact with a retaining cap 74 secured to the latching mechanism end 72 of the control or sensing element 60. The control element is slidably received within the tubular sheath 62 and extends along the bottom 48 in FIG. 6 of the centrifuge with the other end 76 of the control element 60 located adjacent the pulley 52. The sheath 62 in FIG. 4 has one end 78 mounted by a clamp fastener 80 to the base plate 26 of the latching mechanism 22 and its other end 82 in FIG. 6 fastened to the bottom 48 of the centrifuge by a second clamp fastener 84. In FIG. 4 the latching mechanism end 72 of the control element 60 is biased against the reaction lever 70 by a spring 88. While one end of the spring 88 seats on the clamp fastener 80, its other end seats on the retaining cap 74 on the end 72 of the control element 60 to keep it in engagement with the reaction lever 70. The biasing spring 88 retains the contact end 76 of the control element 60 in FIG. 6 out of contact with the belt 54. The reaction lever 70 in FIG. 4 has a guide ledge 90 on which notched end 44 of the turning arm 28 of the latching mechanism moves. Further, the stop lever 63 has a limit edge 92 which prevents movement of the turning arm 28 toward its unlocked position when the rotor is rotating as will be explained below. The stop lever 63 also has a ledge 94 designed to receive the notched end 44 of the turning arm 28 when the turning arm 28 is free to move to its unlocked position when the rotor is stationary.

It should be noted that, as the turning arm 28 moves from its position in FIG. 2 to its position in FIG. 3, the notched end 44 tends to slightly pivot the reaction lever 70 in the direction of the latching mechanism end 72 of the control element 60. This movement is the result of the fact that the notched end 44 of the turning arm 28 with respect to FIG. 2 is slightly to the right of its extreme bottom position of the arc it traverses on the backing plate 26. Consequently, when an operator starts to turn the unlocking knob 20 in FIG. 1, the slight pivoting motion of the reaction lever 70 caused by movement of the turning arm 28 will bring the contact end 76 of the control element into contact with the driving belt 54 on the pulley 52. The contact end 76 of the control element is only brought into contact with the driving belt by the initial turning of the unlocking knob 20. If the pulley 52 is stationary, the contact end 76 of the control element will abut the belt 54 in a first engaging position causing the control element to act as a rigid member throughout its length to permit the latching mechanism end 72 of the control element to act as a pivot point and allow the turning arm 28 to continue its movement to an unlocked position of FIG. 3. If the pulley 52 is moving, the contact end 76 of the control element will deflect against the moving belt 54 in a second engaging position, causing the control element to recede in a direction away from the turning arm 28 and allowing the reaction lever 70 to pivot further around the junction 68, exposing the limit edge 92 of the stop lever 63 to prevent movement of the arm 28 to the unlocking position of FIG. 3.

The control element 60 is preferably made of a tightly wound coil member which is flexible and is capable of being made to any length desired depending upon the distance between the turning arm 28 and the rotating shaft 50. Consequently, when the contact end 76 of the control element 60 abuts a stationary surface, it, being within the sheath 62, will act as a rigid member throughout its entire length. On the other hand, if the control element 60 should contact a moving surface, the end 76, being flexible and outside the sheath 62, would deflect on the moving surface, collapsing the rigid nature of the control element. The control element 60 could also be constructed with the contact end 76 being comprised of a short length of a flexible tightly wound spring connected in longitudinal alignment with a cable slidably mounted within the sheath 62. The control element should have a single generally uniform elongated configuration between its contact end 76 and its latching mechanism end 72.

Turning to the operation of the present invention, reference is made to FIG. 5 where the pulley 52 as well as the rotor (not shown) turn on the rotor shaft 50. When the rotor is moving, it is a necessary safety feature that the cover 14 in FIG. 1 be locked and prevented from an inadvertent opening which could result in possible harmful operator contact with the high speed rotor. Because the control element 60 in FIG. 5 is made of a flexible material, when the contact end 76 moves toward and contacts the drive belt 54, the control element 60 will deflect as shown and cause a receding or sliding movement of the control element within the sheath 62. This will result in the latching mechanism end 72 of the control element moving slightly toward the sheath 62, causing a clockwise pivotal movement of the reaction lever 70 about the pivot junction 68 on the stop lever 63 by movement of the turning arm 28 along the guide flange 90. Therefore, an unlocking or clockwise turning motion of the turning arm 28 by an individual attempting to open the cover 14 in FIG. 1 will result in the turning arm 28 in FIG. 5 contacting the stop edge 92 of the stop lever 63. The stop lever 63 is retained in a position to block the movement of the turning arm 28 by the spring 66. The stop edge 92 will prevent any further movement of the turning arm and will retain the lock hook 34 in FIG. 2 engaged with the lock bar 40 to prevent any opening of the cover 14.

However, when the rotor comes to a complete stop and the shaft 50 is stationary, movement of the contact end 76 of the control element 60 toward the drive belt 54 and pulley 52 will result in the contact end 76 abutting the belt 54 in FIG. 4 and presenting a rigid condition throughout the entire length of the control element, preventing a downward pivoting movement of the reaction lever 70. The longitudinal axis of the control element 60 adjacent the contact end 76 will be in substantial intersecting alignment with the rotational axis of the shaft 50. As the turning arm 28 moves to the left in FIG. 4, the pivot junction 68 between the stop lever 63 and the reaction lever will move downward, lowering the block edge 92 sufficiently enough to allow the turning arm to move along over the guide flange 90 and the stop lever 63 to continue its movement to the position shown in FIG. 3. The cover 14 may be opened, since the locking hook 34 is disengaged from the lock bar 40.

Consequently, the opening of the cover 14 in FIG. 1 is controlled by the sensing or control element 60 in response to the movement of the rotor within the centrifuge 10. This provides an automatic safety feature to the centrifuge to prevent an inadvertent opening of the cover 14 during the movement of the rotor, because the control element will automatically prevent turning of the unlocking knob 20.

Although attention has been directed to use of the present invention with a rotatable member such as a centrifuge rotor, it is contemplated that the present invention could be used with any movable member as an automatic safety mechanism for a door, cover, or guard latch.

What is claimed is:
1. A safety latching apparatus for use with a cover enclosing a machine having a movable member, said apparatus comprising:
   a latch member mounted on one of said cover and said machine and movable between a locked position and an unlocked position; and
   an elongated control element having one end interacting with said latch member and the other end located adjacent said movable member, said control element having a single generally uniform elongated configuration between said one end and said other end, said control element movable between a first and a second engaging position with said movable member, said other end of said control element engaging said movable member, said other end being generally rigid when a force is exerted in substantially a longitudinal direction with said other end, said other end being deflective when a force is exerted in a generally transverse direction to the longitudinal direction of said other end, said movable member when stationary blocking longitudinal movement of said other end of said control element to said second position to allow said latch member to move to said unlocked position, said movable member when moving exerting a transverse force on said other end of said control element and deflecting said other end of said control element as said control element moves to said second position to prevent said latch member from moving to said unlocked position.

2. A safety latching apparatus as defined in claim 1 wherein said elongated flexible control element comprises a tightly wound spring cable.

3. A safety latching apparatus as defined in claim 1 and additionally comprising:
   a limit bar having one end pivotally mounted adjacent said latch member and the other end forming a blocking edge; and
   a reaction lever having one end pivotally mounted on said one end of said limit bar and the other end contacting said one end of said control element, said pitoval junction between said limit bar and said reaction lever being movable, said other end of said reaction lever establishing a fixed fulcrum when said control element is in said first position causing said pivotal junction and said blocking edge to move away from said latch arm as it moves toward said unlocked position.

4. A safety latching apparatus as defined in claim 1 wherein said control element adjacent said one end of said control element is comprised of a flexible tightly wound spring.

5. A safety latching apparatus as defined in claim 1 wherein said moving member is a rotating member, said one end of said control element has its longitudinal axis in substantial intersecting alignment with the rotational axis of said rotating member when said control element is in said first engaging position.

6. A safety latch apparatus for securing a cover to a machine having a rotatable member, said apparatus comprising:
   a latch member mounted on one of said cover and said machine, said latch member being movable between a locked and unlocked position;
   a movable limit bar mounted on said one of said cover and said machine adjacent said latch member;
   a control element extending between said latch member and said rotatable member, one end of said control element acting cooperatively with said latch member to control movement of said limit bar, the other end of said control element in juxtaposed relation with said rotatable member, said control element being a flexible member of generally uniform configuration from said one end to said other end, said other end of said control element in conjunction with said latch member being responsive to the operation of said rotatable member, said other end of said control element being rigid against said rotatable member when in contact with said rotatable member while said rotatable member is stationary preventing any movement of said control element toward said rotatable member and rendering said one end of said control member rigid and stationary to maintain said limit bar in a first position to permit said latch member to move in said unlocked position, said other end of said control member when said rotatable member is moving being movable in a direction toward said rotatable member where said rotatable member causes said other end of said control element to deflect against the moving rotatable member and permit said one end of said control member to shift said limit bar in a second position to prevent movement of said latch member to said unlocked position.

7. A safety latching apparatus for securing a cover to a machine having a rotating member, said apparatus comprising:
   a latch member mounted on one of said cover and said machine, said latch member movable between a locked position and an unlocked position;
   a limit bar movably mounted on said one of said cover and said machine adjacent said latch member;
   a guide member having one end pivotally connected to said limit bar;
   an integrally constructed elongated one piece flexible control member having one end in engagement with the other end of said guide member, the other end of said control member being in juxtaposed relation with said rotating member, said control member being a rigid member in reaction to a force applied to a generally longitudinal direction to said control member, said control member being a deflective member in reaction to a force applied transverse to the longitudinal direction of said control member; and
   a sheath for sliding receipt of said control member between a first position and a second position, said control member having a longer length than said sheath so that said other end of said control member extends outside said sheath, said other end of said control member in said first position abutting said rotating member when said rotating member is not rotating to establish a rigid support to said other end of said guide member to allow said latch to move past said limit bar to said unlocked position, said other end of said control member in said second position being deflected by said rotating member when said rotating member is rotating as said control member is moved toward said rotating member causing said other end of said guide member to deflect away from said latch resulting in said limit bar retaining said latch in said locked position.

8. A safety latching apparatus for preventing the opening of an access cover to a machine having a movable member, said apparatus comprising:
   a latch arm mounted on one of said cover and said machine, said arm movable between a locked position and un unlocked position;
   means mounted adjacent said arm for limiting movement of said latch arm;
   a sheath member extending between said latch arm and said movable member; and
   an elongated control element slidably positioned within said sheath, one end of said control element engaging said limit means, the other end of said control element contacting said movable member, said control element movable relative said sheath a specified distance between a first engaging position and a second engaging position, said control member being a rigid member in reaction to a force applied in a generally longitudinal direction to said control member, said control member being a deflective member in reaction to a force applied transverse to the longitudinal direction of said control member, said control member having a longer length than said sheath so that said other end of said control member extends outside said sheath, said other end of said control element abutting said movable member in said first position establishing a rigid relation with said one end of said control element to retain said limit means from blocking movement of said arm to said unlocked position, said other end of said control element in said second position being deflected by said movable member causing said one end of said control element to allow said limit means to block movement of said arm to said unlocked position, said movable member being stationary when said control element is in said first position and said movable member moving when said control element is in said second position, each of said one end and said other end of said control element moving said specified distance when said control element moves between said first and second positions.

9. A safety latching apparatus for preventing the opening of an access cover to a machine having a rotatable member, said apparatus comprising:
   a latch arm movably mounted on one of said cover and said machine, said latch arm movable between a locked position and an unlocked position;
   a limit member pivotally mounted adjacent said latch arm, said limit member engageable with said latch arm to prevent movement of said arm to said unlocked position;
   a reaction member pivotally mounted on said limit member;
   a sheath member extending between said reaction member and said rotatable member; and
   an elongate flexible control element slidably located within said sheath, said control element being longer than said sheath member, said control element movable relative said sheath between a first position and a second position, said control element having one end in contact with said reaction member and the other end engaged with said rotatable member, said other end of said control element in said first position abutting said rotatable member when stationary and making in conjunction with said sheath said control element rigid between said rotatable member and said reaction member to cause said reaction member to allow said limit member to pivot away from said latch arm and permit said latch arm to move to said unlocked position, said other end of said control element when moved into said second position being deflected by said rotatable member when rotating causing said one end of said control element to move and allow said reaction member to pivot to orient said limit member for blocking engagement with said latch arm and prevent said latch arm from moving to said unlocked position.

* * * * *

UNITED STATES PATENT AND TRADEMARK OFFICE
CERTIFICATE OF CORRECTION

PATENT NO. : 4,076,288
DATED : February 28, 1978
INVENTOR(S) : Christopher Morrison Schwab It is certified that error appears in the above-identified patent and that said Letters Patent are hereby corrected as shown below:

Column 7, line 3,        delete "latch" and insert --latching--.

Column 7, line 57,       first occurrence, delete "to" and insert --in--.

Column 8, line 17,       delete "un" and insert --an--.

Signed and Sealed this

Sixth Day of June 1978

[SEAL]

Attest:

RUTH C. MASON
Attesting Officer

DONALD W. BANNER
Commissioner of Patents and Trademarks